UNITED STATES PATENT OFFICE.

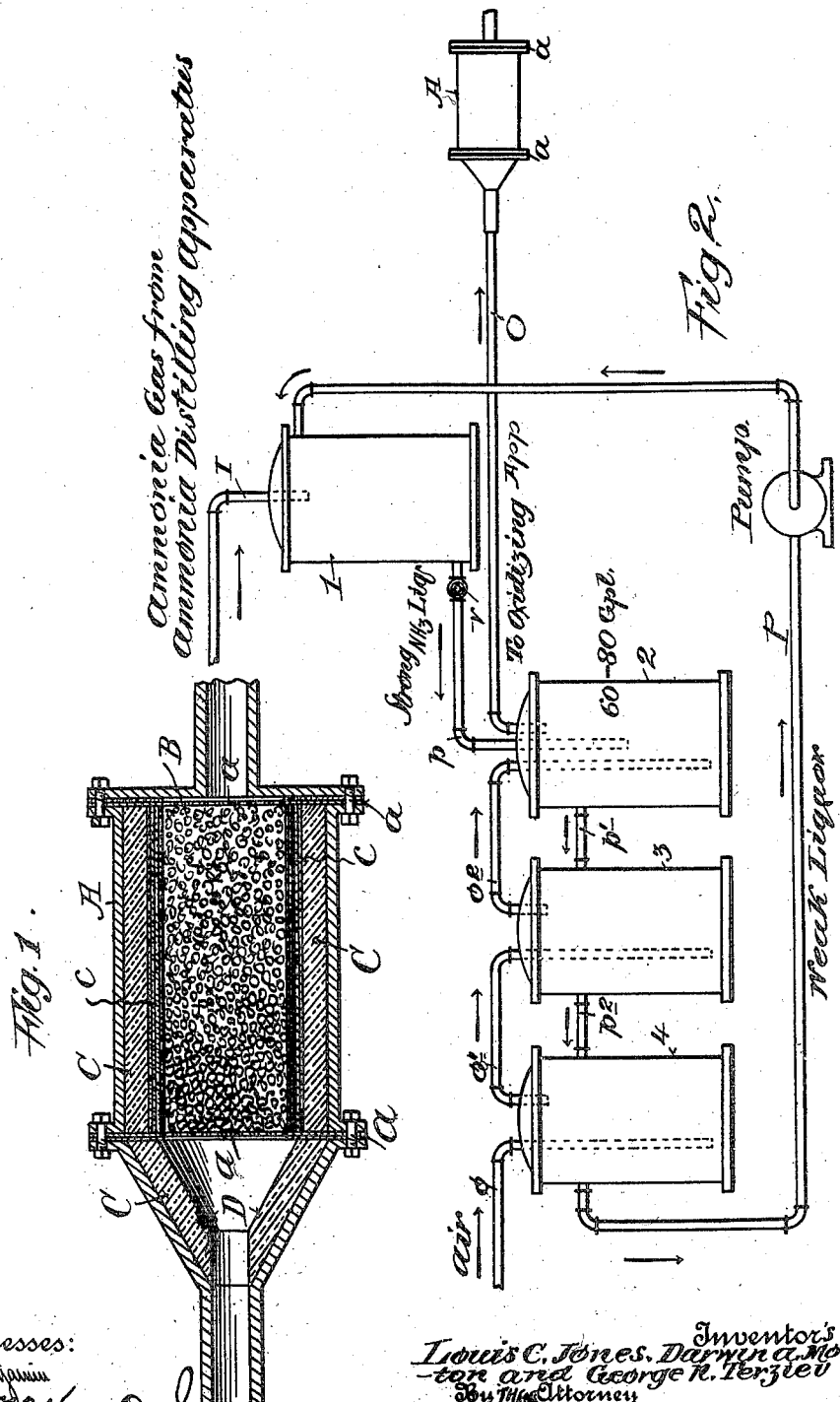

LOUIS C. JONES, DARWIN A. MORTON, AND GEORGE N. TERZIEV, OF SYRACUSE, NEW YORK, ASSIGNORS TO SEMET-SOLVAY COMPANY, OF SYRACUSE, NEW YORK, A CORPORATION OF PENNSYLVANIA.

ART OF OXIDIZING AMMONIA.

1,037,261.  Specification of Letters Patent.  Patented Sept. 3, 1912.

Application filed August 5, 1911.  Serial No. 642,573.

*To all whom it may concern:*

Be it known that we, LOUIS C. JONES, DARWIN A. MORTON, and GEORGE N. TERZIEV, citizens of the United States, residing at Syracuse, in the county of Onondaga and State of New York, have invented certain new and useful Improvements in the Art of Oxidizing Ammonia, of which the following is a specification.

Our invention relates to the formation of oxids of nitrogen by the catalytic oxidation of ammonia to the end of producing nitric acid.

It is well known that when ammonia gas in company with oxygen is submitted to catalytic action oxids of nitrogen may be produced. Heretofore various catalytic agents have been tried for this purpose and the gases have been passed through these at various speeds and at different temperatures in the effort to obtain satisfactory quantitative results by effecting complete oxidation of the ammonia and at the same time avoiding decomposition of the reaction products as formed.

We have discovered that by employing as the carrier of oxygen, *i. e.*, the catalytic or contact agent, a suitable plumbate and passing a mixture of ammonia gas and oxygen through this in the proportion of one volume of $NH_3$ gas to two volumes of oxygen and at a temperature of from 700° C. to 750° C., not only is a practically complete oxidation of the nitrogen of the ammonia into nitrogen oxids, capable of conversion into nitric acid, effected, but the compounds formed are not subject to decomposition after their formation.

The catalytic agent employed by us to effect the reaction is a plumbate, *i. e.*, a compound of lead oxid with the oxid of another suitable metal or base. The base, the oxid of which is combined with the oxid of lead, must be of such nature that its oxid has no tendency to revert, at the temperature of the reaction, to its hydroxid or carbonate in the presence of water vapor or $CO_2$. Furthermore, it must form with lead oxid a plumbate which is infusible within the range of temperature at which the conversion of $NH_3$ to oxids of nitrogen is most complete. For example, the metals magnesium, zinc, aluminum, and cadmium conform to this definition. The compound may be made by heating together either the oxids themselves or the hydroxids, carbonates, nitrates, or other compounds of the metals employed which at a temperature of or below red heat easily yield the oxids. Thus specifically we may produce a plumbate desirable for our purpose by mixing lead oxid with its molecular equivalent of magnesia and heating the mixture to a temperature of about 800° C. for from four to six hours, with frequent stirring to insure excess of oxygen from the air. The lumpy mass formed is, after cooling, broken into small pieces and placed in the apparatus through which the ammonia and air mixture is to be passed.

Such an apparatus is illustrated in section in Figure 1 of the drawings. Fig. 2 shows a diagrammatic view of means for forming and regulating the mixture of ammonia and air employed.

The apparatus, as shown in Fig. 1, consists of a shell, A, forming a hollow vessel within which is contained the catalytic material, B, which latter may be held in place by perforated plates of silver, or other non-oxidizable metal *a*, *a*. The shell, A, consists of a non-oxidizable metal, or in case it consists of a base metal, should be lined with a non-oxidizable metal, such as silver, or other material which will prevent the gases from coming in contact therewith. We have found it convenient to make the shell, A, of iron, protecting the inner surface by a lining of asbestos, C, and packing upon the asbestos a dense layer, *c*, of the catalytic material, so as to prevent the mixed gases from coming in contact with the iron container, or, in case they do, only at a comparatively low temperature. This precaution is necessary in view of the fact that ammonia gas mixed with oxygen, if heated to a temperature of about 700° C. in contact with many substances, particularly iron, is only oxidized to the extent of producing water vapor from the hydrogen present, leaving the nitrogen free, in which condition no further oxidation can take place.

For the same reason the iron surface of the approach to the catalyzer, which may otherwise become considerably heated, should be protected from contact with the gases, as shown at D, and the catalytic substance itself must be free from certain impurities, particularly oxid of iron. The layer of asbestos and the compacted layer of contact material, both of which serve as insulators, prevent the heat developed by the reaction within the apparatus from reaching the outer wall in sufficient amount to heat it to a temperature high enough to produce injurious effects, even if the gases should reach it. By this arrangement also, the heat of the reaction is conserved to such an extent that little or no external heat is required to sustain the required temperature, which, to produce the best results, should range between 700° C. and 750° C. It is, therefore, ordinarily unnecessary to use a recuperating system to preheat the gases and the heat produced by the reaction can be used in part for other useful work. In case, however, the apparatus is small and radiation proportionately great, recuperation may be resorted to to maintain the temperature at the required point. Care must, however, be taken to prevent the heat produced by the reaction from raising the temperature above 750° C., the maximum at which satisfactory yields are obtained, since above this temperature, with the theoretically correct proportions, free nitrogen will be developed either through failure to completely oxidize $NH_3$ or by decomposition of the oxids formed.

The temperature may be controlled by providing a proper adjustment of the insulating material and the external cooling to correspond with the amount, dilution, and temperature of the gases entering the apparatus, as may be ascertained by experiment in any given case. The temperature may also be reduced by reducing the proportion of $NH_3$ in the gas mixture. In this case oxidation of $NH_3$ will be equally complete but there will be a waste of energy through the introduction of excess of air.

In conducting the operation the contact material is first brought to a temperature sufficiently high to start the reaction by directing a flame against one of the perforated plates, $a, a$. The ammonia gas with air in proper proportions to provide an excess of oxygen is then introduced and the reaction begins immediately upon the sweeping out of the products of combustion by the air and ammonia mixture.

The proportion of oxygen to ammonia should not be less than two volumes of oxygen to one volume of ammonia gas. The proportion of oxygen may, however, be increased somewhat, but should preferably not be more than ten per cent. in excess of this.

A mixture of ammonia gas and oxygen of proper proportions may be obtained by passing atmospheric air through ammonia liquor having a strength of from 60 to 80 grams per liter, $NH_3$ at a temperature of 20° C.

In Fig. 2 of the drawings we have illustrated means by which this fact may be utilized in providing a continuous supply of the gas mixture of proper proportions. In this, 1 indicates a vessel, such as the absorber of an ammonia still, containing ammonia liquor of high strength, e. g., 200 grams per liter, or over. From this the ammonia liquor flows by pipe, $p$, provided with a regulating valve, $v$, to a vessel, or tank, 2, at such a rate as to maintain the solution therein at the strength requisite to give a mixture of the desired proportions, when air is passed through it. The overflow from vessel, 2, passes by pipe, $p'$, to vessel, or tank, 3, and thence by pipe, $p^2$, to a fourth vessel, 4. Air is forced first through the liquor in tank, 4, and thence through tanks, 3 and 2, on the counter current principle and from tank, 2, to the catalyzer. The impoverished liquor from tank, 4, is pumped back to the absorber, 1, to be therein reconcentrated. It will be understood that the rate of flow from the absorber, 1, to vessel, 2, will be so proportioned to the amount of air passing through vessel, 2, as to maintain the solution therein of such constant strength as will give a gas mixture of the required proportions.

With the excess of oxygen employed and at the temperatures above stated practically the entire nitrogen contents of the ammonia is, in our process, converted into oxids in the form $N_2O_3$, or approximating $N_2O_3$, which may, after cooling, be absorbed and oxidized in towers to produce nitric acid.

At the temperature described there is little or no tendency for the oxids of nitrogen, when once formed, to be broken up by further contact with the catalytic agent employed. Hence it is not essential that the gases shall pass the contact agent at any specific speed to bring about the desired result, except that it is economical to pass the gas as rapidly as possible and still have the ammonia completely oxidized. Any slower speed, however, does not materially decrease the amount of oxids of nitrogen produced per unit of ammonia consumed.

What we claim as new and desire to secure by Letters Patent, is:

1. The hereinbefore described process of producing nitrogen oxids which consists in passing ammonia gas with an excess of oxygen in contact with a catalytic agent consisting of a plumbate at a temperature below that at which the oxids of nitrogen formed begin to decompose.

2. The hereinbefore described process of producing nitrogen oxids which consists in passing ammonia gas with an excess of oxygen in contact with a catalytic agent consisting of a plumbate at a temperature of from 700° C. to 750° C.

3. The hereinbefore described process of producing nitrogen oxids which consists in passing ammonia gas with an excess of oxygen in contact with a catalytic agent consisting of a plumbate formed from the oxids of lead and of a metal the oxid of which, at a temperature of 750° C., is infusible and has no tendency to revert to its hydroxid or carbonate in the presence of water vapor or $CO_2$.

In testimony whereof, we have hereunto subscribed our names, this 1st day of August A. D., 1911.

LOUIS C. JONES.
DARWIN A. MORTON.
GEORGE N. TERZIEV.

Witnesses:
HORACE G. CARRELL,
H. DUANE BRUCE.